(12) United States Patent
Yokoi et al.

(10) Patent No.: US 12,267,144 B2
(45) Date of Patent: Apr. 1, 2025

(54) ANTENNA DEVICE, INTEGRATED COMMUNICATION DEVICE, AND WIRELESS COMMUNICATION DEVICE

(71) Applicant: DENSO CORPORATION, Kariya (JP)

(72) Inventors: Shinichi Yokoi, Kariya (JP); Shirou Koide, Kariya (JP); Takuya Yamashita, Kariya (JP)

(73) Assignee: DENSO CORPORATION, Kariya (JP)

( * ) Notice: Subject to any disclaimer, the term of this patent is extended or adjusted under 35 U.S.C. 154(b) by 421 days.

(21) Appl. No.: 17/671,291

(22) Filed: Feb. 14, 2022

(65) Prior Publication Data

US 2022/0166493 A1   May 26, 2022

Related U.S. Application Data

(63) Continuation of application No. PCT/JP2020/031008, filed on Aug. 17, 2020.

(30) Foreign Application Priority Data

Aug. 28, 2019 (JP) ................................. 2019-156091

(51) Int. Cl.
*H04B 7/155* (2006.01)
*H01Q 1/32* (2006.01)
*H01Q 9/04* (2006.01)

(52) U.S. Cl.
CPC ....... *H04B 7/15528* (2013.01); *H01Q 1/3275* (2013.01); *H01Q 9/045* (2013.01)

(58) Field of Classification Search
CPC .................................................. H04B 7/15528
See application file for complete search history.

(56) References Cited

U.S. PATENT DOCUMENTS

| 2014/0028507 A1 | 1/2014 | Mierke et al. |
| 2014/0357311 A1 | 12/2014 | Suzuki et al. |
| 2020/0350663 A1 | 11/2020 | Ambe et al. |

FOREIGN PATENT DOCUMENTS

| JP | 2011025850 A | 2/2011 |
| JP | 2014232998 A | 12/2014 |
| JP | 5960797 B2 | 8/2016 |
| JP | 2017168938 A | 9/2017 |
| JP | 6314277 B1 | 4/2018 |

*Primary Examiner* — Hsinchun Liao
(74) *Attorney, Agent, or Firm* — Harness, Dickey & Pierce, P.L.C.

(57) ABSTRACT

An antenna device includes: a plurality of antenna elements for a plurality of communication systems; a housing that houses the plurality of antenna elements; and a digital signal processing circuit connected to one of the plurality of antenna elements and configured to perform a demodulation process to demodulate an analog signal received by the one of the plurality of antenna elements to obtain a digital signal, or/and a modulation process to modulate a digital signal to an analog signal and output the modulated analog signal to the one of the plurality of antenna elements. At least one of the plurality of antenna elements communicates with outside of the antenna device by an analog signal on a signal line connected to the at least one of the plurality of antenna elements.

13 Claims, 3 Drawing Sheets

ANTENNA DEVICE, INTEGRATED COMMUNICATION DEVICE, AND WIRELESS COMMUNICATION DEVICE

CROSS REFERENCE TO RELATED APPLICATION

The present application is a continuation application of International Patent Application No. PCT/JP2020/031008 filed on Aug. 17, 2020, which designated the U.S. and claims the benefit of priority from Japanese Patent Application No; 2019-156091 filed on Aug. 28, 2019. The entire disclosures of all of the above applications are incorporated herein by reference.

TECHNICAL FIELD

The present disclosure relates to an antenna device, an integrated communication device, and a wireless communication device, BACKGROUND An antenna device is known, which has a plurality of antenna elements for a plurality of communication systems in one housing. An antenna element for GNSS, an antenna element for mobile communication using a telephone line, an antenna element for vehicle-to-vehicle communication; and the like are housed in the one housing.

SUMMARY

According to an aspect of the present disclosure; an antenna device includes:
 a plurality of antenna elements for a plurality of communication systems;
 a housing that houses the plurality of antenna elements; and
 a digital signal processing circuit connected to one of the plurality of antenna elements and configured to perform a demodulation process to demodulate an analog signal received by the one of the plurality of antenna elements to obtain a digital signal, or/and a modulation process to modulate a digital signal to an analog signal and output the modulated analog signal to the one of the plurality of antenna elements.

At least one of the plurality of antenna elements communicates with outside of the antenna device by an analog signal on a signal line connected to the at least one of the plurality of antenna elements.

DESCRIPTION OF EMBODIMENT

Figure 1:
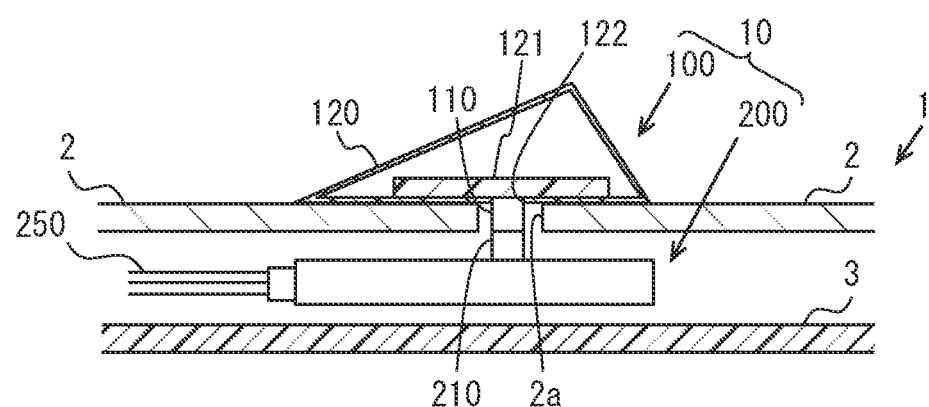
FIG. 1 is a diagram showing an overall configuration of an integrated communication device according to an embodiment.

To begin with, examples of relevant techniques will be described.

An antenna device is known, which has a plurality of antenna elements for a plurality of communication systems in one housing, An antenna element for GNSS, an antenna element for mobile communication using a telephone line, an antenna element for vehicle-to-vehicle communication, and the like are housed in the one housing.

An antenna device has a plurality of antenna elements in one housing. The antenna device is required to be downsized since the significance of accommodating the plurality of antenna elements in one housing is lost if the antenna device is too large. If the antenna device is downsized, radio waves radiated from the antenna element housed in the housing or from the signal line connected to the antenna element may flow into a signal path for the other communication system, causing radio wave interference.

The radio wave interference between the antenna elements can be reduced by separating the antenna elements from each other. However, the radio wave interference cannot be sufficiently suppressed by the separating. It is also necessary to suppress radio wave interference caused by radio wave radiation from the signal line connected to the antenna element. It is also conceivable to separate the signal lines from each other to suppress the radio wave interference caused by the radio wave radiation from the signal lines. However, the farther the signal lines are from each other, the larger the opening provided in the antenna device for passing the communication line for communicating with the outside.

The present disclosure provides an antenna device, an integrated communication device, and a wireless communication device so as to suppress the radio wave interference, make the opening provided in the antenna device for passing the communication line smaller, and suppress the increase in size.

The present disclosure is achieved by a combination of the features described in independent claim, and the sub claims provide further advantageous specific examples. The reference numerals described in the following description indicate, as one embodiment, the correspondence with the specific means described in the embodiments described later, and do not limit the disclosed technical scope.

According to an aspect of the present disclosure, an antenna device includes:
 a plurality of antenna elements for a plurality of communication systems;
 a housing that houses the plurality of antenna elements; and
 a digital signal processing circuit connected to one of the plurality of antenna elements and configured to perform a demodulation process to demodulate an analog signal received by the one of the plurality of antenna elements to obtain a digital signal, or/and a modulation process to modulate a digital signal to an analog signal and output the modulated analog signal to the one of the plurality of antenna elements.

At least one of the plurality of antenna elements communicates with outside of the antenna device by an analog signal on a signal line connected to the at least one of the plurality of antenna elements.

The antenna device includes the antenna elements, and a part of the antenna elements is connected to the digital signal processing circuit. In the signal path including the antenna element to which the digital signal processing circuit is connected, the signal is digitized in the antenna device. The digitized signal is less likely to flow into the signal path of another communication system and cause radio wave interference. The number of coaxial lines extending from outside the antenna device to inside of the antenna device can be reduced, compared with a case where signals for all the antenna elements are led out to the outside of the antenna device by coaxial lines, since the digital signal processing circuit is connected to some of the antenna elements. As a result, the opening provided in the antenna device can be made smaller for passing a communication line for communicating with the outside, such as a coaxial line.

Further, some of the antenna elements communicate with the outside of the antenna device by analog signals on signal lines. Therefore, the digital signal processing circuit for the some of the antenna elements is not required in the housing. It is possible to suppress the increase in size of the antenna device, as compared with a case where the digital signal processing circuit is prepared for all the antenna elements in the antenna device, since the digital signal processing circuit is not needed for the some of the antenna elements in the housing.

According to another aspect of the present disclosure, an integrated communication device includes:

the antenna device; and a wireless communication device connected to the antenna device.

The wireless communication device has a main body signal processing circuit into which an analog signal received by at least one of the antenna elements is input from the antenna device on a signal line, the main body signal processing circuit being configured to perform a demodulation process to demodulate the analog signal to obtain a digital signal, or/and a modulation process to modulate a digital signal to an analog signal and output the modulated analog signal to the antenna device; and an input unit into which a digital signal demodulated by the antenna device is input.

According to another aspect of the present disclosure, a wireless communication device for the integrated communication device includes:

a digital signal processing circuit into which an analog signal is input through a signal line, the analog signal being received by at least one antenna element; and an input unit into which a digital signal is input, the digital signal being obtained by demodulating an analog signal received by at least one antenna element.

The digital signal processing circuit is configured to perform a demodulation process to demodulate the analog signal to obtain a digital signal, or/and a modulation process to modulate a digital signal to an analog signal and output the modulated analog signal to outside.

An embodiment will be described below with reference to the drawings. FIG. 1 is a diagram showing an overall configuration of an integrated communication device 10 of the present embodiment. The integrated communication device 10 is mounted on a vehicle 1. More specifically, the integrated communication device 10 is installed on a roof 2 of the vehicle 1.

The integrated communication device 10 includes an antenna device 100 and a wireless communication device 200. The antenna device 100 is installed on the outer surface of the roof 2. Another member such as a waterproof seal member may be interposed between the antenna device 100 and the roof 2.

The wireless communication device 200 is housed between the roof 2 and a lining sheet 3. The lining sheet 3 may serve as a ceiling inside the vehicle interior. The antenna device 100 and the wireless communication device 200 are electrically connected by a pair of board-to-board connectors (hereinafter, simply connectors) 110 and 210.

The antenna device 100 includes one housing 120. The housing 120 is made of resin. The shape of the housing 120 can be arbitrarily designed. For example, the housing 120 may have a shark fin type shape. Specifically, the housing 120 has a streamlined shape in a horizontal cross section and a substantially triangular shape in a vertical cross section.

A substrate 121 or the like is housed inside the housing 120. The substrate 121 is arranged so as to be substantially parallel to the roof 2 when the housing 120 is attached to the vehicle 1. The antenna element 130 shown in FIG. 2, the digital signal processing circuit 140, and the like are arranged on the substrate 121. Components attached to the substrate 121 are omitted in FIG. 1. The detailed configuration of the wireless communication device 200 is omitted in FIG. 1 while the wireless communication device 200 includes various parts shown in FIG. 2.

The antenna device 100 has the connector 110 installed on the substrate 121. The connector 110 is visible from the outside of the antenna device 100 by providing the housing 120 with an opening 122. In the state shown in FIG. 1, the connector 110 is fitted into an opening 2a formed in the roof 2. The connector 110 can be fitted into and separated from the connector 210 provided in the wireless communication device 200.

Figure 2:
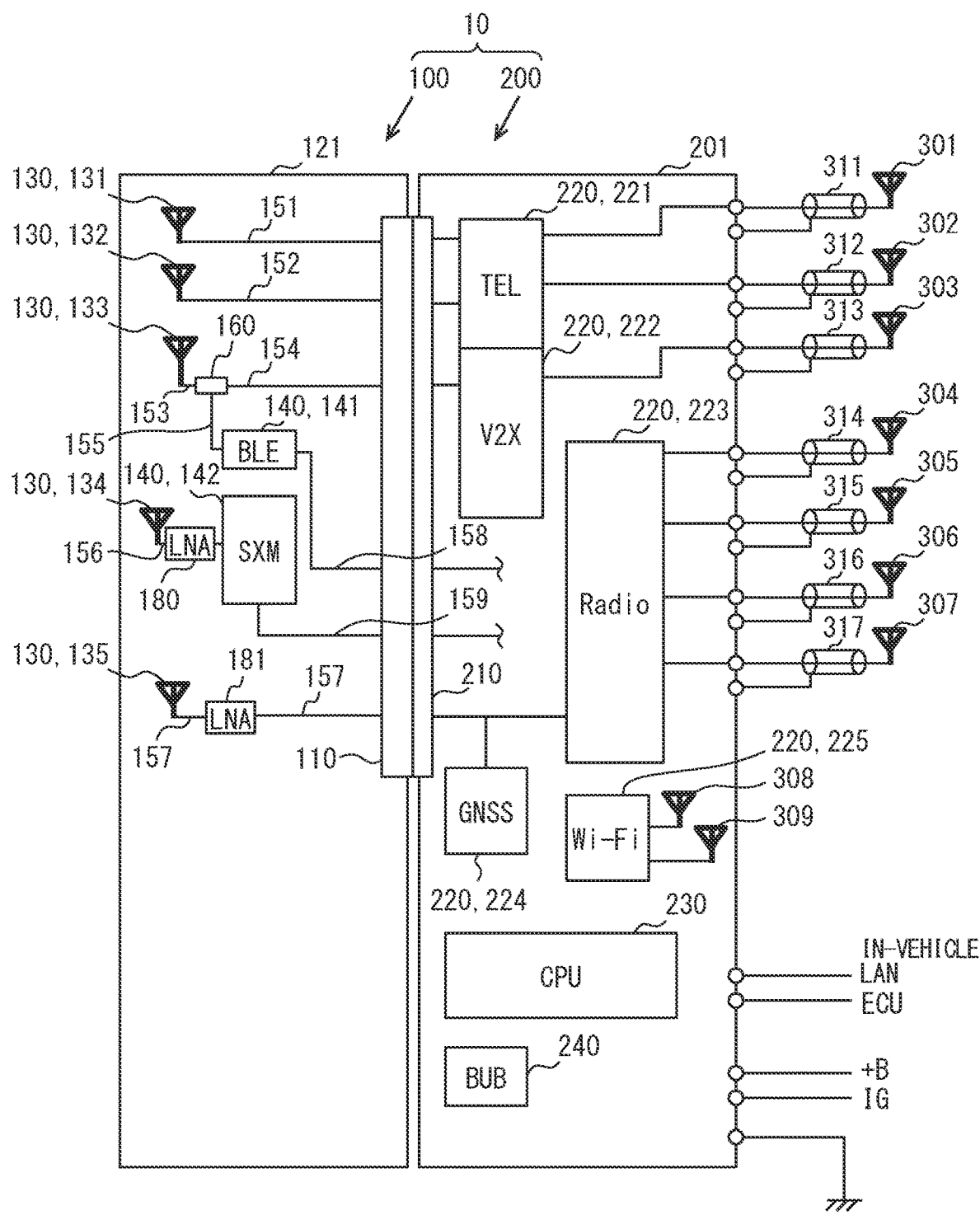
FIG. 2 is a diagram illustrating an electrical configuration of an antenna device and a wireless communication device.

FIG. 2 is a diagram illustrating an electrical configuration of the antenna device 100 and the wireless communication device 200. The electrical configuration of the antenna device 100 and the wireless communication device 200 will be described with reference to FIG. 2.

[Electrical Configuration of Antenna Device 100]

In this embodiment, the antenna device 100 includes five antenna elements 131, 132, 133, 134, 135. When the five antenna elements 131, 132, 133, 134, 135 are not distinguished from each other, the antenna elements 131, 132, 133, 134, 135 are referred to as the antenna element 130, The first telephone antenna element 131 is for a public telephone communication system. The second telephone antenna element 132 is also for a public telephone communication system. The first telephone antenna element 131 and the second telephone antenna element 132 transmit and receive radio waves having different frequencies. The first telephone antenna element 131 is an element capable of transmitting and receiving radio waves having a frequency of 699 MHz to 4900 MHz. The second telephone antenna element 132 is an element capable of transmitting and receiving radio waves having a frequency of 1710 MHz to 4900 MHz. In the case of carrier aggregation or the like, the first telephone antenna element 131 shall transmit and receive radio waves in the 2.5 Hz band. The second telephone antenna element 132 transmits and receives radio waves in the 2.1 GHz band.

The shared antenna element 133 receives radio waves for two communication systems. Specifically, the shared antenna element 133 receives radio waves for a vehicle-to-vehicle communication system, which is a short-range wireless communication system, and radio waves for a Bluetooth Low Energy (BLE) system. Bluetooth is a registered trademark. The frequency used by the vehicle-to-vehicle communication system is the 5.9 GHz band, and the frequency used by the BLE is the 2.4 HGz band. Since 5.9 GHz is more than twice as high as 2.4 HGz, they can be shared by one antenna element.

The SXM antenna element 134 is for an SXM radio system. The SXM radio system uses a frequency of 2.3 GHz and performs digital radio broadcasting using a communication satellite.

The GNSS antenna element 135 is an antenna that receives radio waves transmitted by a positioning satellite included in the GNSS (Global Navigation Satellite System). The frequency band of radio waves used by GNSS is, for example, 1.5 GHz.

The end of the antenna element 130 is directly or indirectly connected to the pattern line provided on the substrate 121, The pattern line is a signal line formed of copper foil or the like and through which an electric signal flows.

The pattern line 151 connected to the first telephone antenna element 131 and the pattern line 152 connected to the second telephone antenna element 132 are both connected to the connector 110. A diplexer 160 is connected to the pattern line 153 connected to the shared antenna element 133. The diplexer 160 is a demultiplexer, and demultiplexer an analog signal indicating a radio wave received by the shared antenna element 133 into two pattern lines 154 and 155. The pattern line 154 is connected to the connector 110, and the pattern line 155 is connected to the BLE communication circuit 141, which is a digital signal processing circuit 140.

The pattern line 156 connected to the SXM antenna element 134 is connected to the SXM receiving circuit 142, which is a digital signal processing circuit 140, via a low noise amplifier 180. The pattern line 157 connected to the GNSS antenna element 135 is connected to the connector 110 via a low noise amplifier 181.

A pattern line 158 is also connected to the BLE communication circuit 141. The other end of the pattern line 158 is connected to the connector 110. The BLE communication circuit 141 performs modulation process and demodulation process. The modulation process performed by the BLE communication circuit 141 modulates the digital signal supplied from the wireless communication device 200 via the pattern line 158 into an analog signal, and the modulated analog signal is output to the shared antenna element 133 via the diplexer 160.

The demodulation process performed by the BLE communication circuit 141 is a process of demodulating an analog signal indicating a radio wave received by the shared antenna element 133 to obtain a digital signal.

The SXM receiving circuit 142 performs a demodulation process of demodulating an analog signal received by the SXM antenna element 134 and input via the low noise amplifier 180 to obtain a digital signal. The SXM receiving circuit 142 is connected to the digital connector portion 112 of the connector 110 via the pattern line 159, The SXM receiving circuit 142 outputs the digital signal obtained by the demodulation process to the connector 110 via the pattern line 159.

The pattern lines 158 and 159 are signal lines through which digital signals flow. The pattern line 151, the pattern line 152, and the pattern line 157 are signal lines to output an analog signal to the outside of the antenna device 100.

[Electrical Configuration of Wireless Communication Device 200]

In addition to the connector 210, the wireless communication device 200 includes plural wireless circuits 220, a CPU 230, and a backup battery 240, which are installed on the same substrate 201.

The wireless communication device 200 is connected to various devices such as ECU (Electronic Control Unit) installed in the vehicle 1 via an in-vehicle LAN. The wireless communication device 200 may be directly connected to the ECU by wiring, A power supply line+B and an ignition signal IG are also input to the wireless communication device 200.

Specifically, the wireless circuit 220 included in the wireless communication device 200 has a telephone communication circuit 221, a V2X communication circuit 222, a radio receiving circuit 223, a GNSS receiving circuit 224, and a Wi-Fi communication circuit 225. Wi-Fi is a registered trademark.

The telephone communication circuit 221, the V2X communication circuit 222 and the GNSS receiving circuit 224 of the wireless circuit 220 are electrically connected to the antenna device 100. The telephone communication circuit 221, the V2X communication circuit 222 and GNSS receiving circuit 224 correspond to a digital signal processing circuit such as a main body signal processing circuit that converts analog signals from the antenna device 100 into digital signals.

The telephone communication circuit 221 is connected to the first telephone antenna element 131 and the second telephone antenna element 132 of the antenna device 100 via a pattern line, the connector 210, 110, the pattern line 151, and the pattern line 152 on the substrate 201. The signal flowing between the first telephone antenna element 131, the second telephone antenna element 132, and the telephone communication circuit 221 is an analog signal. The telephone communication circuit 221 is also connected to the third telephone antenna element 301 via a pattern line on the substrate 201 and a coaxial cable 311. Further, the telephone communication circuit 221 is connected to the fourth telephone antenna element 302 via a pattern line on the substrate 201 and a coaxial cable 312.

The third telephone antenna element 301 and the fourth telephone antenna element 302 have the same frequency as the first telephone antenna element 131 and the second telephone antenna element 132, or have a different frequency. For example, the third telephone antenna element 301 transmits and receives 800 MHz radio waves, and the fourth telephone antenna element 302 receives 1.8 GHz radio waves.

A digital signal to be transmitted to the outside of the vehicle 1 is input to the telephone communication circuit 221 from an ECU or the like installed in the vehicle 1. The telephone communication circuit 221 performs a modulation process to modulate the digital signal into an analog signal. The analog signal obtained by modulation is for transmitting radio waves from any one of the first telephone antenna element 131, the second telephone antenna element 132, the third telephone antenna element 301, and the fourth telephone antenna element 302. The telephone communication circuit 221 inputs and outputs the modulated analog signal to any one of the first telephone antenna element 131, the second telephone antenna element 132, the third telephone antenna element 301, and the fourth telephone antenna element 302.

The telephone communication circuit 221 also acquires radio waves received by the first telephone antenna element 131, the second telephone antenna element 132, the third telephone antenna element 301, and the fourth telephone antenna element 302 as analog signals, and performs a demodulation process to demodulate the analog signals.

The V2X communication circuit 222 is connected to the shared antenna element 133 of the antenna device 100 via a pattern line, the connector 210, 110, and a pattern line 154 on the substrate 201. The signal flowing between the shared antenna element 133 and the V2X communication circuit 222 is an analog signal. The V2X communication circuit 222 is also connected to the V2X sub-antenna element 303 via a pattern line on the substrate 201 and a coaxial cable 313.

A digital signal for vehicle-to-vehicle communication transmitted to the outside of the vehicle 1 is input to the V2X communication circuit 222 from an ECU or the like installed in the vehicle 1. The V2X communication circuit 222 modulates the digital signal into an analog signal in the modulation process. The analog signal obtained by modulation is an analog signal for transmitting radio waves from either the shared antenna element 133 or the V2X sub-antenna element 303. The V2X communication circuit 222 outputs the modulated analog signal to either or both of the shared antenna element 133 and the V2X sub-antenna element 303.

The V2X communication circuit 222 also acquires radio waves received by the shared antenna element 133 and the V2X sub-antenna element 303 as analog signals, and performs a demodulation process for demodulating the analog signals. The demodulated digital signal is output to the in-vehicle LAN or the like.

The four radio antenna elements 304, 305, 306, 307 are connected to the radio receiving circuit 223 via coaxial cables 314, 315, 316, 317, respectively, and signal lines on the substrate 201. The four radio antenna elements 304, 305, 306, 307 receive radio waves different from each other in frequencies. The radio waves received by some of the radio antenna elements 304, 305, 306, 307 are radio waves for digital radio. The radio receiving circuit 223 acquires an analog signal indicating a radio wave received by the radio antenna elements 304, 305, 306, 307. The radio receiving circuit 223 demodulates the acquired analog signal.

The GNSS receiving circuit 224 is connected to the GNSS antenna element 135 of the antenna device 100 via a pattern line, the connector 210, 110, and a pattern line 157 on the substrate 201. The signal flowing between the GNSS antenna element 135 and the V2X communication circuit 222 is an analog signal. The GNSS receiving circuit 224 performs a demodulation process for demodulating the received analog signal.

Two antenna elements 308 and 309 are connected to the Wi-Fi communication circuit 225 via a signal line on the substrate 201. A digital signal is input to the GNSS receiving circuit 224. The GNSS receiving circuit 224 modulates the digital signal into an analog signal in a modulation process. Further, the GNSS receiving circuit 224 acquires the radio waves received by the antenna elements 308, 309 as analog signals, and performs a demodulation process for demodulating the analog signals.

The CPU 230 is a control unit that controls the telephone communication circuit 221, the V2X communication circuit 222, the radio receiving circuit 223, and the GNSS receiving circuit 224. The CPU 230 inputs a digital signal to be transmitted to the outside to the telephone communication circuit 221 and the V2X communication circuit 222. Further, the CPU 230 acquires a digital signal demodulated by the telephone communication circuit 221, the V2X communication circuit 222, the radio receiving circuit 223, and the GNSS receiving circuit 224. The CPU 230 transmits the acquired digital signal to a device mounted on the vehicle 1, which is determined according to the type of signal.

The backup battery 240 supplies electric power to various electronic components included in the integrated communication device 10 when the electric power supply from the main battery mounted on the vehicle 1 is interrupted.

[Arrangement on the Substrate 121]

Figure 3:
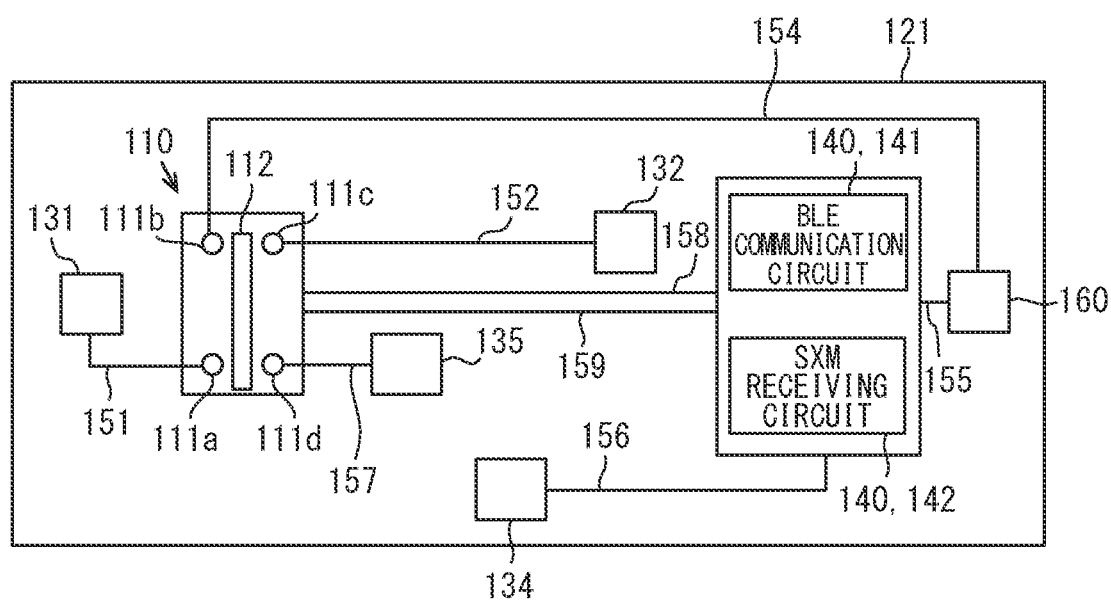
FIG. 3 is a conceptual diagram illustrating an arrangement of components and pattern lines on a substrate.

FIG. 3 is a conceptual diagram illustrating the arrangement of components and pattern lines on the substrate 121. FIG. 3 illustrates a lower surface of the substrate 121 facing the wireless communication device 200. The substrate 121 has a rectangular shape in a plan view.

Of the radio waves transmitted and received by the plurality of antenna elements 130 included in the antenna device 100, the following three radio waves are likely to interfere with each other: the radio waves in the 2.5 GHz band transmitted and received by the first telephone antenna element 131; the radio waves in the 2.4 GHz band for the BLE system transmitted and received by the shared antenna element 133; and the radio waves for 2.3 GHz transmitted and received by the SXM antenna element 134. The three radio waves are relatively close in frequencies, compared with the remaining three frequency bands, that is, 1.5 GHz, 2.1 GHz and 5.9 GHz bands, of the six frequency bands transmitted and received by the antenna element 130 included in the antenna device 100. Therefore, it can be said that these three frequency bands are likely to interfere with each other. The public communication system using the radio waves transmitted and received by the first telephone antenna element 131 is an interference target communication system for the BLE system and the SXM radio system.

In order to avoid the mutual interference, among the antenna elements that transmit and receive the three frequency bands, the first telephone antenna element 131 is arranged near one end in the longitudinal direction of the substrate 121, adjacent to the left end in FIG. 3. The pattern line 151 connected to the first telephone antenna element 131 extends toward the center in the longitudinal direction of the substrate 121 and is connected to the analog connector portion 111a of the connector 110.

The connector 110 has four analog connector portions 111a, 111b, 111c, and 111d, which are referred to as analog connector unit 111 when the four analog connector portions 111a, 111b, 111c, and 111d are not distinguished from each other. The analog connector unit 111 includes a coaxial line. The coaxial line is a communication line including an inner conductor and an outer conductor, similar to a coaxial cable.

The connector 110 has a digital connector portion 112. The digital connector portion 112 opens in a rectangular shape. The digital connector portion 112 is interposed between the analog connector portion 111a and the analog connector portion 111d at a position near one end portion of the digital connector portion 112 in the longitudinal direction of the digital connector portion 112. The digital connector portion 112 is interposed between the analog connector portion 111b and the analog connector portion 111c at a position near the other end of the digital connector portion 112.

The connector 210 of the wireless communication device 200 has connector portions that are fitted with the four analog connector portions 111a, 111b, 111c, 111d and the digital connector portion 112, respectively. The connector 210 has a connector portion that fits with the digital connector portion 112, and works as an input unit into which the digital signal demodulated by the antenna device 100 is input.

FIG. 3 illustrates the antenna elements 131, 132, 134, and 135 connected to the substrate 121. The antenna elements 131, 132, 134, and 135 may be provided on the upper surface of the substrate 121. The diplexer 160, the BLE communication circuit 141, and the SXM receiving circuit 142 may also be provided on the upper surface of the substrate 121. In FIG. 3, the BLE communication circuit 141 and the SXM receiving circuit 142 are configured as one module. Unlike this, the BLE communication circuit 141 and the SXM receiving circuit 142 can be separated from each other.

The diplexer 160 is arranged at the other end of the substrate 121 in the longitudinal direction opposite to the first telephone antenna element 131. Therefore, the shared antenna element 133 for transmitting and receiving radio waves for BLE is arranged on the substrate 121 at the end opposite to the first telephone antenna element 131.

The analog signal indicating the radio wave for the BLE system is input to the BLE communication circuit 141 via the pattern line 155 and is converted into a digital signal. The pattern line 158 through which the digital signal flows extends toward the first telephone antenna element 131 and is connected to the digital connector portion 112 of the connector 110. Therefore, the pattern line 158 is close to the pattern line 151 at the portion connected to the connector 110. However, since the signal flowing through the pattern line 158 is a digital signal, even if the pattern line 158 and the pattern line 151 are close to each other, signal interference is suppressed.

Further, the BLE communication circuit 141 is arranged close to the diplexer 160. Therefore, the BLE communication circuit 141 is arranged closer to the shared antenna element 133 than to the first telephone antenna element 131. Further, the pattern line 155 connecting the BLE communication circuit 141 and the diplexer 160 is also arranged closer to the shared antenna element 133 than to the first telephone antenna element 131.

The SXM antenna element 134 is arranged near the center of the substrate 121 in the longitudinal direction. The SXM receiving circuit 142 is integrated with the BLE communication circuit 141, and is arranged at the end of the substrate 121 on the same side as the diplexer 160. Therefore, the pattern line 156 connecting the SXM antenna element 134 and the SXM receiving circuit 142 extends in a direction away from the first telephone antenna element 131 and is connected to the SXM receiving circuit 142.

The pattern line 154 has one end connected to the diplexer 160, and the other end connected to the analog connector portion 111b of the connector 110. The second telephone antenna element 132 and the GNSS antenna element 135 are arranged near the center in the longitudinal direction of the substrate 121. In other words, the second telephone antenna element 132 and the GNSS antenna element 135 are arranged between the first telephone antenna element 131 or the connector 110 and the BLE communication circuit 141 and the SXM receiving circuit 142.

The pattern line 152 has one end connected to the second telephone antenna element 132, and extends linearly. The other end of the pattern line 152 is connected to the analog connector portion 111c. The pattern line 157 has one end connected to the GNSS antenna element 135, and extends linearly. The other end of the pattern line 157 is connected to the analog connector portion 111d.

When the antenna device 100 having this configuration and the wireless communication device 200 are electrically connected, the antenna device 100 is installed on the roof 2. At this time, the connector 110 is visible from the opening 122. In this state, the operator brings the wireless communication device 200 to a position where the connector 210 of the wireless communication device 200 faces the connector 110. After that, when the wireless communication device 200 is moved upward, the connector 110 and the connector 210 are coupled. As a result, the antenna device 100 and the wireless communication device 200 are electrically connected. In the wireless communication device 200, as shown in FIG. 1, the cable 250 extends. The cable 250 transmits and receives signals between various devices mounted on the vehicle 1 and the wireless communication device 200.

Summary of Embodiment

The integrated communication device 10 of the present embodiment includes the five antenna elements 130. Of these five antenna elements 130, the shared antenna element 133 and the SXM antenna element 134 are connected to the BLE communication circuit 141 and the SXM receiving circuit 142, which correspond to a digital signal processing circuit 140.

In the signal path including the antenna element 130 to which the digital signal processing circuit 140 is connected, the signal is digitized in the antenna device 100. The digitized signal is less likely to flow into the signal path of another communication system and cause radio wave interference. Further, the number of coaxial lines extending from the outside of the antenna device 100 to the inside of the antenna device 100 can be reduced as compared with the case where the signals for all the antenna elements 130 are led out to the outside of the antenna device 100 by coaxial wires. As a result, the opening 122 provided in the antenna device 100 for passing a communication line for communicating with the outside, such as a coaxial line, can be made smaller. Further, when the antenna device 100 and the wireless communication device 200 are provided to oppose to each other through the roof 2 as in the present embodiment, the opening 2a provided in the roof 2 can be made smaller.

The first telephone antenna element 131, the second telephone antenna element 132, a signal path of the shared antenna element 133 connected to the pattern line 154, and the GNSS antenna element 135 communicate with the outside of the antenna device 100 through an analog signal. Therefore, the digital signal processing circuit 140 for some antenna elements is not required inside the housing 120. Since the digital signal processing circuit 140 for some antenna elements is not inside the housing 120, it is possible to suppress the increase in size of the antenna device 100 as compared with the case where all the digital signal processing circuits 140 are provided in the antenna device 100.

In the present embodiment, of the six types of frequency bands received by the five antenna elements 130, three frequency bands having relatively close frequencies are set as frequency bands in which radio wave interference is likely to occur. The digital signal processing circuit 140, specifically, the BLE communication circuit 141 and the SXM receiving circuit 142 process signals of a communication system using radio waves in a frequency band in which radio wave interference is likely to occur, to output a digital signal flowing through the pattern lines 158 and 159.

In this way, the antenna device 100 processes a signal for the communication system that transmits and receives radio waves in a frequency band in which radio waves are likely to interfere with each other by the digital signal processing circuit 140 provided inside the antenna device 100. As a result, it is possible to further suppress radio wave interference inside the antenna device 100 while suppressing the increase in size of the antenna device 100.

The antenna device 100 collectively outputs digital signals to the outside of the device by one connector 110. As a result, the portion that outputs the digital signal to the outside of the device can be miniaturized. Further, the connector 110 includes the analog connector unit 111 to which an analog signal is input from the first telephone antenna element 131, the second telephone antenna element 132, the shared antenna element 133, and the GNSS antenna element 135. That is, the connector 110 inputs and outputs a digital signal and an analog signal integrally. With such a configuration, the connector 110 can be miniaturized.

Further, the digital connector portion 112 is interposed between the analog connector portion 111a and the analog connector portion 111d, and also interposed between the analog connector portion 111b and the analog connector portion 111c. With this configuration, it is possible to suppress radio wave interference in the connector 110 while realizing miniaturization of the connector 110 by arranging the plural analog connector units 111 on the one connector 110.

Further, in the antenna device 100, the BLE communication circuit 141 is positioned closer to the shared antenna element 133 that transmits and receives radio waves of the BLE system than the first telephone antenna element 131 that transmits and receives radio waves that are likely to cause radio wave interference with the BLE system. Therefore, the pattern line 155 connecting the BLE communication circuit 141 and the shared antenna element 133 can also be arranged apart from the first telephone antenna element 131. Radio wave interference can also be suppressed by arranging the pattern line 155 away from the first telephone antenna element 131.

Further, the antenna device 100 includes the shared antenna element 133. The pattern line 154 and pattern line 155 on which two types of analog signals demultiplexed by the diplexer 160 connected to the shared antenna element 133 flow are also likely to interfere with each other due to radio wave radiation from them. However, in the present embodiment, the BLE communication circuit 141 is connected to one of the pattern lines 155, and the analog signal flowing through the pattern line 155 is converted into a digital signal by the BLE communication circuit 141. The mutual interference between the digital signal flowing through the pattern line 158 connecting the BLE communication circuit 141 and the connector 110 and the analog signal flowing through the pattern line 154 is small. Therefore, radio wave interference can be suppressed compared with a case where the pattern line 155 is connected to the connector 110.

Although the embodiment has been described above, the disclosed technology is not limited to the above-described embodiment, and the following modifications are included in the disclosed range, and various modifications can be made without departing from the gist except as described below. In the following description, elements having the same reference numerals as those used so far are the same as elements having the same reference numerals in the previous embodiments, except when specifically mentioned. When only some parts of the configuration are described, the previously described embodiment may be applied to other parts of the configuration.

<Modification 1>

In the embodiment, all the signals input/output to/from the antenna device 100 are passed through the connector 110. However, it is not necessary for the input/output of all signals to pass through the connector 110. A coaxial cable may be connected to the antenna device 100. Further, the digital signal may be output from the antenna device 100 by a cable.

<Modification 2>

In the embodiment, two of the three frequency bands in which radio wave interference is likely to occur are digitized in the antenna device 100. However, radio waves in only one of the three frequency bands may be digitized in the antenna device 100. Further, the number of antenna elements 130 included in the antenna device 100 and the number of antenna elements 130 connected to the digital signal processing circuit 140 are not limited to those disclosed in the above-described embodiment.

What is claimed is:

1. An antenna device comprising:
   a plurality of antenna elements for a plurality of communication systems;
   a housing that houses the plurality of antenna elements; and
   a digital signal processing circuit connected to one of the plurality of antenna elements and configured to perform a demodulation process to demodulate an analog signal received by the one of the plurality of antenna elements to obtain a digital signal, or/and a modulation process to modulate a digital signal to an analog signal and output the modulated analog signal to the one of the plurality of antenna elements, wherein
   at least one of the plurality of antenna elements communicates with outside of the antenna device by an analog signal on a signal line connected to the at least one of the plurality of antenna elements,
   at least two of the plurality of antenna elements communicate with outside of the antenna device by analog signals on signal lines for the plurality of communication systems different from each other, and
   the digital signal processing circuit processes a signal for one of the plurality of communication systems which is more likely to cause interference with the other communication system than at least one of the communication systems that communicate with outside of the antenna device by the analog signal on the signal line.

2. The antenna device according to claim 1 further comprising a connector connected to the digital signal processing circuit to output a digital signal to outside of the antenna device.

3. The antenna device according to claim 2, wherein the connector has
   a digital connector unit electrically connected to a signal line extending from the digital signal processing circuit, and
   an analog connector unit connected to the signal line.

4. The antenna device according to claim 3, wherein
   the analog connector unit includes a plurality of analog connector portions, and
   the digital connector unit is interposed between one of the plurality of analog connector portions and another one of the plurality of analog connector portions.

5. The antenna device according to claim 1, wherein
   the digital signal processing circuit is located nearer the antenna element connected to the digital signal processing circuit than an antenna element of an interference target communication system which is likely to have a radio interference with a communication system for which the digital signal processing circuit processes a signal.

6. The antenna device according to claim 5, wherein
   a signal line connecting the digital signal processing circuit and the antenna element is arranged at a position farther from the antenna element of the interference target communication system than the digital signal processing circuit is.

7. The antenna device according to claim 1 further comprising:
   a shared antenna element configured to receive a radio wave for the plurality of communication systems; and
   a demultiplexer that demultiplexes the radio wave received by the shared antenna element, wherein
   a part of a signal line connected to the demultiplexer is connected to the digital signal processing circuit.

8. An integrated communication device comprising:
the antenna device according to claim 1; and
a wireless communication device connected to the antenna device, wherein
the wireless communication device has
a main body signal processing circuit into which an analog signal received by at least one of the antenna elements is input from the antenna device on a signal line, the main body signal processing circuit being configured to perform a demodulation process to demodulate the analog signal to obtain a digital signal, or/and a modulation process to modulate a digital signal to an analog signal and output the modulated analog signal to the antenna device; and
an input unit into which a digital signal demodulated by the antenna device is input.

9. The integrated communication device according to claim 8, which is mounted on a vehicle, wherein
the antenna device is installed on an outer surface of the vehicle, and
the wireless communication device is installed inside the vehicle.

10. The integrated communication device according to claim 8, which is mounted on a roof of a vehicle.

11. The integrated communication device according to claim 10, wherein
the antenna device is installed on an outer surface of the roof of the vehicle, and
the wireless communication device is arranged to oppose the antenna device through the roof.

12. An antenna device comprising:
a plurality of antenna elements for a plurality of communication systems;
a housing that houses the plurality of antenna elements; and
a digital signal processing circuit connected to one of the plurality of antenna elements and configured to perform a demodulation process to demodulate an analog signal received by the one of the plurality of antenna elements to obtain a digital signal, or/and a modulation process to modulate a digital signal to an analog signal and output the modulated analog signal to the one of the plurality of antenna elements, wherein
at least one of the plurality of antenna elements communicates with outside of the antenna device by an analog signal on a signal line connected to the at least one of the plurality of antenna elements,
the antenna device further comprising a connector connected to the digital signal processing circuit to output a digital signal to outside of the antenna device,
wherein the connector has
a digital connector unit electrically connected to a signal line extending from the digital signal processing circuit, and
an analog connector unit connected to the signal line.

13. An antenna device comprising:
a plurality of antenna elements for a plurality of communication systems;
a housing that houses the plurality of antenna elements; and
a digital signal processing circuit connected to one of the plurality of antenna elements and configured to perform a demodulation process to demodulate an analog signal received by the one of the plurality of antenna elements to obtain a digital signal, or/and a modulation process to modulate a digital signal to an analog signal and output the modulated analog signal to the one of the plurality of antenna elements, wherein
at least one of the plurality of antenna elements communicates with outside of the antenna device by an analog signal on a signal line connected to the at least one of the plurality of antenna elements,
the antenna device further comprising:
a shared antenna element configured to receive a radio wave for the plurality of communication systems; and
a demultiplexer that demultiplexes the radio wave received by the shared antenna element, wherein
a part of a signal line connected to the demultiplexer is connected to the digital signal processing circuit.

* * * * *